(12) United States Patent
Konishi et al.

(10) Patent No.: US 9,565,574 B2
(45) Date of Patent: Feb. 7, 2017

(54) COMMUNICATION CONTROL APPARATUS, RADIO BASE STATION APPARATUS, RADIO TERMINAL APPARATUS, AND COMMUNICATION CONTROL METHOD

(71) Applicant: KDDI CORPORATION, Shinjuku-ku (JP)

(72) Inventors: Satoshi Konishi, Tokyo (JP); Toshiaki Yamamoto, Tokyo (JP); Xiaoqiu Wang, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 14/759,963

(22) PCT Filed: Jan. 16, 2014

(86) PCT No.: PCT/JP2014/050642
§ 371 (c)(1),
(2) Date: Jul. 9, 2015

(87) PCT Pub. No.: WO2014/112546
PCT Pub. Date: Jul. 24, 2014

(65) Prior Publication Data
US 2015/0358833 A1 Dec. 10, 2015

(30) Foreign Application Priority Data
Jan. 17, 2013 (JP) .................................. 2013-006774

(51) Int. Cl.
*H04W 16/32* (2009.01)
*H04W 36/00* (2009.01)
*H04W 24/10* (2009.01)

(52) U.S. Cl.
CPC ............. *H04W 16/32* (2013.01); *H04W 24/10* (2013.01); *H04W 36/0083* (2013.01); *H04W 36/0088* (2013.01)

(58) Field of Classification Search
None
See application file for complete search history.

(56) References Cited

U.S. PATENT DOCUMENTS

| 2011/0009095 | A1 | 1/2011 | Uemura et al. |
| 2012/0052899 | A1* | 3/2012 | Wang ................. H04W 52/226 455/513 |

(Continued)

FOREIGN PATENT DOCUMENTS

| JP | 2003-506960 A | 2/2003 |
| JP | 2012-034048 A | 2/2012 |
| WO | 01/11804 A1 | 2/2001 |
| WO | 2009/116427 A1 | 9/2009 |

OTHER PUBLICATIONS

3GPP, TS 36.133, v11.3.0 (Dec. 2012), pp. 1-661.
(Continued)

*Primary Examiner* — Diane Mizrahi
(74) *Attorney, Agent, or Firm* — Morgan, Lewis & Bockius LLP

(57) ABSTRACT

A communication control apparatus, in a wireless communication system having an area in which coverage areas of a macro cell base station and a small cell base station using different frequency bands overlap, includes a storage unit and a control unit. The storage unit stores small cell base station information indicating whether the small cell base station is present within a coverage area of a macro cell base station. The control unit instructs a radio terminal apparatus present within the coverage area of the macro cell base station to perform quality measurement in a frequency band of the small cell base station when the small cell base station is present within the coverage area of the macro cell base station based on the small cell base station information.

7 Claims, 3 Drawing Sheets

(56) References Cited

U.S. PATENT DOCUMENTS

| | | | |
|---|---|---|---|
| 2012/0263145 A1 | 10/2012 | Marinier et al. | |
| 2013/0028228 A1* | 1/2013 | Nakayama | H04W 16/04 370/329 |
| 2013/0210445 A1* | 8/2013 | Nakamura | H04W 16/32 455/448 |
| 2013/0288695 A1* | 10/2013 | Okino | H04L 5/0073 455/450 |
| 2015/0043546 A1* | 2/2015 | Nakamura | H04W 16/32 370/336 |
| 2015/0223253 A1* | 8/2015 | Nakayama | H04W 16/04 370/329 |
| 2015/0319756 A1* | 11/2015 | Okino | H04L 5/0073 370/330 |
| 2016/0242123 A1* | 8/2016 | Harada | H04W 16/32 |

OTHER PUBLICATIONS

3GPP, TS 36.331, v10.8.0 (Dec. 2012), pp. 1-305.
International Search Report dated Apr. 22, 2014, for International application No. PCT/JP2014/050642.
Supplementary European Search Report, issued in European Patent Application No. 14740622.7 on Jul. 20, 2016.
Nokia Siemens Networks, Nokia Corporation, "Enhancements for Small Cell Detection" 3GPP TSG-RAN WG2 Meeting #77, Dresden, Germany, Feb. 6-10, 2012.

* cited by examiner

FIG. 3
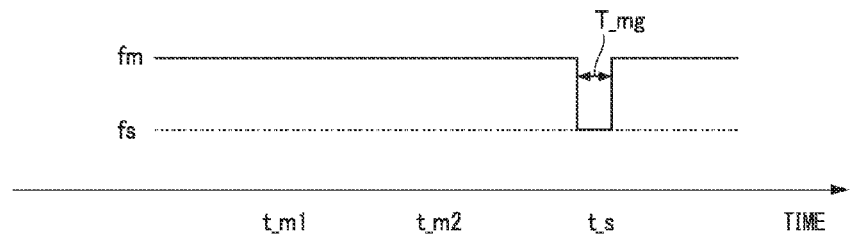
FIG. 4
| Gap Pattern Id | Measurement Gap Length (MGL, ms) | Measurement Gap Repetition Period (MGRP, ms) |
|---|---|---|
| 0 | 6 | 40 |
| 1 | 6 | 80 |
FIG. 5
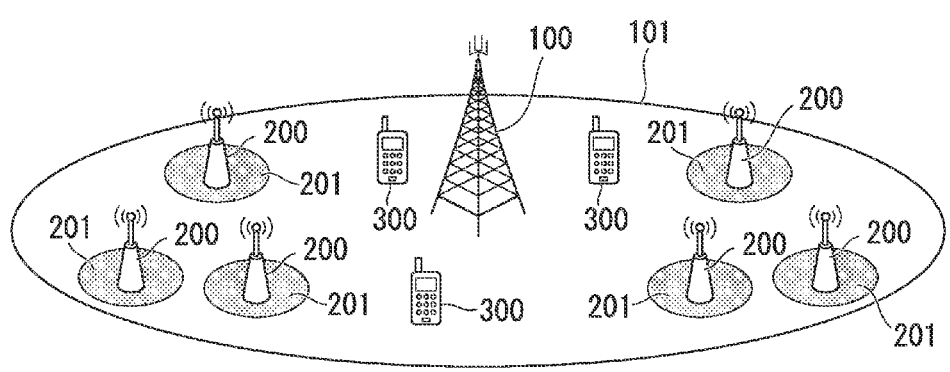

COMMUNICATION CONTROL APPARATUS, RADIO BASE STATION APPARATUS, RADIO TERMINAL APPARATUS, AND COMMUNICATION CONTROL METHOD

TECHNICAL FIELD

The present invention relates to a communication control apparatus, a radio base station apparatus, a radio terminal apparatus, and a communication control method.

Priority is claimed on Japanese Patent Application No. 2013-006774, filed Jan. 17, 2013, the content of which is incorporated herein by reference.

BACKGROUND ART

In recent years, a wireless communication network referred to as a heterogeneous network (HetNet) has been known. As disclosed in Patent Document 1 (Japanese Unexamined Patent Application, First Publication No. 2012-34048), a configuration example of HetNet is illustrated in FIG. 5. In FIG. 5, a macro cell 101 uses a relatively low frequency band and the coverage (a range in which communication service can be provided) of the macro cell 101 is wide. A small cell 201 is disposed to overlap the macro cell 101 and uses a relatively high frequency band and the coverage of the small cell 201 is narrow.

When the macro cell 101 and the small cell 201 use different frequency bands, a radio terminal apparatus (user equipment (UE)) 300 of a user switches a base station to be connected by performing a handover between different bands, between a radio base station apparatus (hereinafter referred to as a macro cell base station) 100 of the macro cell 101 and a radio base station apparatus (hereinafter referred to as a small cell base station) 200 of a small cell 201. Here, for example, when the UE 300 connected to the macro cell base station 100 using a frequency band fm performs the handover between the different bands to the small cell base station 200 using a frequency band fs, the UE 300 measures a radio signal in the frequency band fs so as to find the small cell 201 for which the handover is possible. In the measurement of the radio signal, the UE 300 switches the frequency band to be used from fm to fs in a measurement period referred to as a measurement gap (for example, see Patent Document 1).

In addition, in Non-Patent Document 1 (3GPP, TS 36.133), a measurement gap is disclosed in a wireless communication scheme referred to as long term evolution (LTE) which is being standardized in the $3^{rd}$ generation partnership project (3GPP). As an example of the quality measurement instruction, content of a quality measurement instruction of a different band is disclosed in Non-Patent Document 2 (3GPP, TS 36.331). In Non-Patent Document 2, as the quality measurement instruction of the different band, notifying the UE 300 of quality measurement parameters such as a frequency to be measured, a report type (periodic or event trigger), and a measurement gap and information such as a cell individual offset (CIO) and "time-to-trigger (TTT)" necessary for a transmission determination process in a quality measurement result report (measurement report) from the UE 300 to the macro cell base station 100 is disclosed.

DOCUMENTS OF THE PRIOR ART

Patent Document

[Patent Document 1]
Japanese Unexamined Patent Application, First Publication No. 2012-34048

Non-Patent Documents

[Non-Patent Document 1]
3GPP, TS 36.133 described above.
[Non-Patent Document 2]
3GPP, TS 36.331 described above.

DISCLOSURE OF INVENTION

Problem to be Solved by the Invention

In the measurement of the radio signal using the above-described conventional measurement gap, the measurement gap is provided periodically. Thus, there is a problem in terms of frequency use efficiency because the UE 300 connected to the macro cell base station 100 switches the frequency band to be used from fm to fs in the measurement gap even when there is no small cell 201 in the vicinity. In addition, there is a disadvantage in terms of saving power consumption of the UE 300.

The present invention has been made in consideration of such circumstances, and an object of the invention is to provide a communication control apparatus, a radio base station apparatus, a radio terminal apparatus, and a communication control method capable of contributing to the improvement of efficiency in the measurement of a radio signal using a measurement gap.

Means for Solving the Problem

In order to solve the aforementioned problems, according to the present invention, a communication control apparatus in a wireless communication system having an area in which coverage areas of a macro cell base station and a small cell base station using different frequency bands overlap includes: a storage unit configured to store small cell base station information indicating whether the small cell base station is present within the coverage area of the macro cell base station; and a control unit configured to instruct a radio terminal apparatus present within the coverage area of the macro cell base station to perform quality measurement in a frequency band of the small cell base station when the small cell base station is present within the coverage area of the macro cell base station based on the small cell base station information.

According to the present invention, a communication control apparatus in a wireless communication system having an area in which coverage areas of a macro cell base station and a small cell base station using different frequency bands overlap includes: a storage unit configured to store macro cell base station information indicating whether the macro cell base station is present within a predetermined range from the small cell base station; and a control unit configured to instruct a radio terminal apparatus present within the predetermined range from the small cell base station to perform quality measurement in a frequency band of the macro cell base station when the macro cell base station is present within the predetermined range from the small cell base station based on the macro cell base station information.

According to the present invention, a radio base station apparatus includes either of the above-described communication control apparatuses.

According to the present invention, a radio terminal apparatus includes either of the above-described communication control apparatuses.

According to the present invention, a radio terminal apparatus in a wireless communication system having an area in which coverage areas of a macro cell base station and a small cell base station using different frequency bands overlap and having either of the above-described communication control apparatuses includes: a receiving unit configured to receive the instruction of the quality measurement from the communication control apparatus; and a measuring unit configured to perform the quality measurement based on the instruction of the quality measurement from the communication control apparatus.

According to the present invention, a communication control method in a wireless communication system having an area in which coverage areas of a macro cell base station and a small cell base station using different frequency bands overlap includes: a storage step of storing small cell base station information indicating whether the small cell base station is present within the coverage area of the macro cell base station; and a control step of instructing a radio terminal apparatus present within the coverage area of the macro cell base station to perform quality measurement in a frequency band of the small cell base station when the small cell base station is present within the coverage area of the macro cell base station based on the small cell base station information.

According to the present invention, a communication control method in a wireless communication system having an area in which coverage areas of a macro cell base station and a small cell base station using different frequency bands overlap includes: a storage step of storing macro cell base station information indicating whether the macro cell base station is present within a predetermined range from the small cell base station; and a control step of instructing a radio terminal apparatus present within the predetermined range from the small cell base station to perform quality measurement in a frequency band of the macro cell base station when the macro cell base station is present within the predetermined range from the small cell base station based on the macro cell base station information.

Effects of the Invention

According to the present invention, there is an advantageous effect in that it is possible to contribute to the improvement of efficiency in the measurement of a radio signal using a measurement gap.

BRIEF DESCRIPTION OF THE DRAWINGS

FIG. 3 is an explanatory diagram illustrating a measurement gap according to the present invention.

FIG. 4 is a table illustrating an example of a measurement gap pattern.

FIG. 5 is an explanatory diagram illustrating a configuration example of a HetNet.

EMBODIMENTS FOR CARRYING OUT THE INVENTION

Hereinafter, embodiments of the present invention will be described with reference to the drawings. In the following embodiment, LTE will be described as an example of a wireless communication scheme. In addition, description will be given using a configuration example of the HetNet illustrated in FIG. 5.

Figure 1:
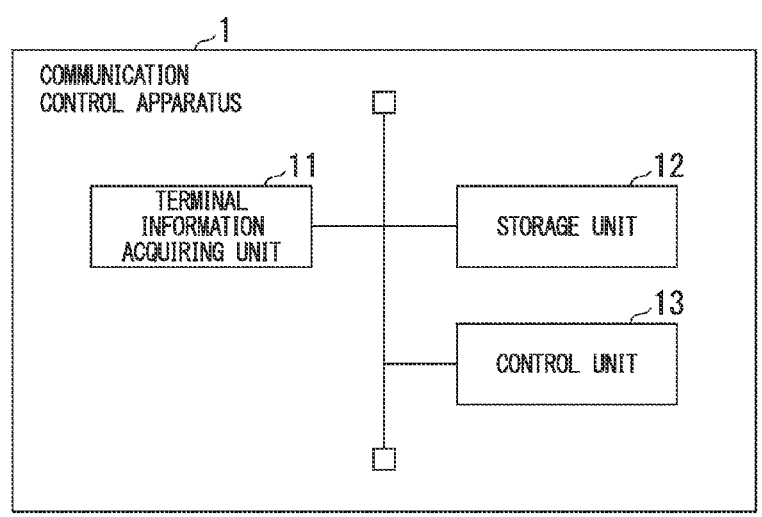
FIG. 1 is a block diagram illustrating a configuration example of a communication control apparatus 1 according to an embodiment of the present invention.

FIG. 1 is a block diagram illustrating a configuration example of a communication control apparatus 1 according to an embodiment of the present invention.

In FIG. 1, the communication control apparatus 1 includes a terminal information acquiring unit 11, a storage unit 12, and a control unit 13.

The terminal information acquiring unit 11 acquires movement information of the UE 300. The movement information includes information indicating a movement speed of the UE 300. In addition, the movement information may include information indicating a movement direction of the UE 300.

In addition, the terminal information acquiring unit 11 acquires terminal connection information indicating a connection state between the UE 300 and a base station.

The storage unit 12 stores information (small cell base station information) about a small cell base station 200. Hereinafter, examples (1) to (5) of the small cell base station information are shown.

(1) Small cell base station presence/absence information indicating whether the small cell base station 200 is present within a coverage area of the macro cell base station 100.

(2) Number-of-small-cell-base-stations information indicating the number of small cell base stations 200 present within the coverage area of the macro cell base station 100.

(3) Small cell base station direction information indicating a direction of the small cell base station 200 viewed from the macro cell base station 100.

(4) Small cell size information indicating a size (area) of a coverage area of the small cell base station 200.

(5) Small cell range information indicating a position and a cell radius of the small cell base station 200.

The storage unit 12 stores some or all of the above-described small cell base station information exemplified in examples (1) to (5). Also, when there is no small cell base station 200 within the coverage area of the macro cell base station 100, the above-described small cell base station direction information, small cell size information, and small cell range information are absent.

The storage unit 12 manages the small cell base station information, for example, in the form of a table. In addition, the small cell base station information of the small cell base station 200 around the macro cell base station 100, for example, is acquired using an input of an operator, an existing "autonomous neighbor relation (ANR)" function or an existing position estimation method of the small cell base station, and the like.

The control unit 13 controls a search for the small cell base station by the UE 300 using the movement information and the terminal connection information of the UE 300 acquired by the terminal information acquiring unit 11 and the small cell base station information stored in the storage unit 12.

Figure 2:
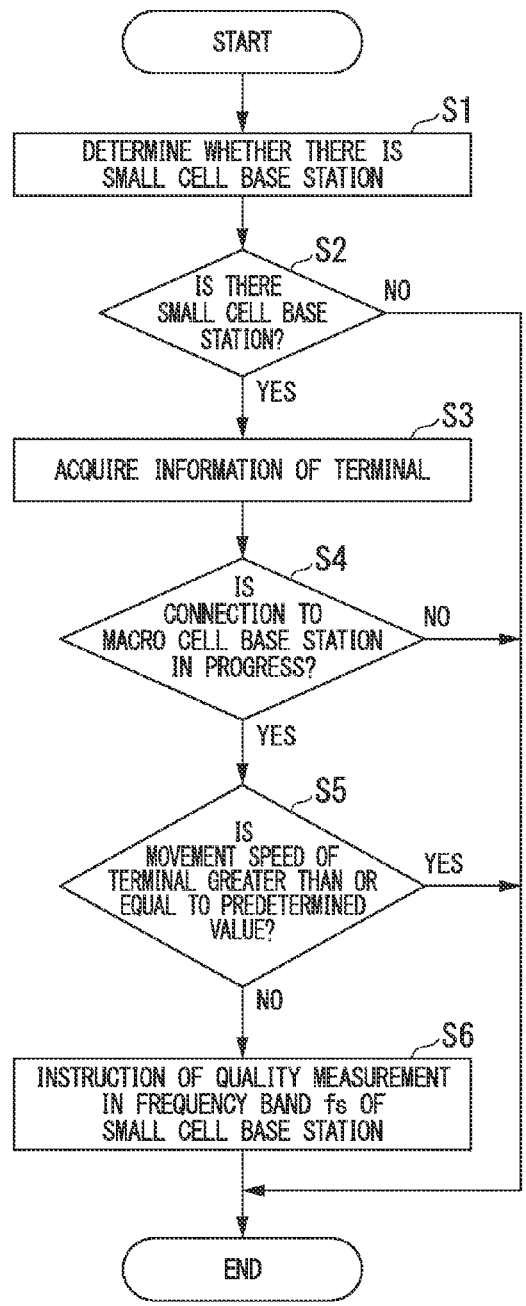
FIG. 2 is a flowchart of a search control process according to an embodiment of the present invention.

An operation of the control unit 13 will be described with reference to FIG. 2. FIG. 2 is a flowchart of a search control process according to this embodiment.

(Step S1) The control unit 13 determines whether the small cell base station 200 is present within the coverage area of the macro cell base station 100 based on the small cell base station information stored in the storage unit 12.

(Step S2) When a result of the determination of step S1 indicates that the small cell base station 200 is present, the process proceeds to step S3. On the other hand, when the small cell base station 200 is absent, the process in FIG. 2 is terminated.

(Step S3) The control unit 13 acquires the movement information and the terminal connection information of the UE 300 from the terminal information acquiring unit 11.

(Step S4) The control unit 13 determines whether the UE 300 is being connected to the macro cell base station 100 based on the terminal connection information of the UE 300. When a result of this determination indicates that the connection to the macro cell base station 100 is in progress, the process proceeds to step S5. On the other hand, when the connection to the macro cell base station 100 is not in progress, the process in FIG. 2 is terminated.

Also, when the terminal connection information of the UE 300 is not acquired, the process may proceed to step S5 by skipping step S4.

(Step S5) The control unit 13 determines whether the movement speed of the UE 300 is greater than or equal to a predetermined value based on the movement information of the UE 300. When a result of this determination indicates that the movement speed is greater than or equal to the predetermined value, the process in FIG. 2 is terminated. On the other hand, the process proceeds to step S6 when the movement speed is less than the predetermined value.

Also, when the movement information of the UE 300 includes the movement direction of the UE 300, the control unit 13 may determine whether the UE 300 is moving toward the small cell base station 200 based on the movement direction of the UE 300. The process proceeds to step S6 when a result of this determination indicates that the UE 300 is moving toward the small cell base station 200 and the process in FIG. 2 is terminated when the UE 300 is not moving toward the small cell base station 200.

In addition, when the movement information of the UE 300 is not acquired, the process may proceed to step S6 by skipping step S5.

(Step S6) The control unit 13 instructs the UE 300 to perform quality measurement in the frequency band fs of the small cell base station 200.

As an example of the quality measurement instruction, content of a quality measurement instruction of a different band is disclosed in Non-Patent Document 2. In Non-Patent Document 2, as the quality measurement instruction of the different band, notifying the UE 300 of quality measurement parameters such as a frequency to be measured, a report type (periodic or event trigger), and a measurement gap and information such as a cell individual offset (CIO) and "time-to-trigger (TTT)" necessary for a transmission determination process in a quality measurement result report (measurement report) from the UE 300 to the macro cell base station 100 is disclosed.

The UE 300 includes a receiving unit configured to receive a quality measurement instruction from the communication control apparatus 1 and a measuring unit configured to perform quality measurement based on the quality measurement instruction from the communication control apparatus 1. When the quality measurement instruction is received in the frequency band fs of the small cell base station 200, the UE 300 provides a measurement gap T_mg as illustrated in FIG. 3. The UE 300 measures a radio signal in the frequency band fm of the macro cell base station 100 at timings t_m1 and t_m2

On the other hand, at timing t_s, the measurement gap T_mg is provided. For the measurement gap T_mg, the UE 300 switches the frequency band to be used from the frequency band fm of the macro cell base station 100 to the frequency band fs of the small cell base station 200 and measures a radio signal in the frequency band fs.

FIG. 4 is a table illustrating an example of a measurement gap pattern. The measurement gap pattern of FIG. 4 is disclosed in Non-Patent Document 1. In FIG. 4, two types of measurement gap patterns (gap pattern IDs are 0 and 1) are defined. In FIG. 4, the measurement gap pattern includes a measurement gap length (MGL) (ms) and a measurement gap repetition period (MGRP) (ms).

Although the two types of measurement gap patterns are defined in FIG. 4, the number of types of measurement gap patterns may further increase. For example, a measurement gap pattern (for example, MGRP=20 ms) in which the MGRP is shortened may be provided for the UE 300 which is moving toward the small cell base station 200. In addition, when the movement speed of the UE 300 is higher, the MGRP may be further shortened.

In addition, the measurement gap pattern having the MGRP according to the number of small cell base stations 200 present within the coverage area of the macro cell base station 100 may be provided. An example in which the MGRP is further shortened when the number of small cell base stations 200 is larger may be included.

In addition, when the coverage area of the small cell base station 200 is larger, the MGRP may be further shortened. In addition, when a cell range of the small cell base station 200 is closer to the UE 300, the MGRP may be further shortened.

Although the embodiments of the present invention have been described with reference to the drawings, specific configurations are not limited to these embodiments and design modifications without departing from the subject matter of the present invention are also included.

For example, when the UE 300 is not connected to the macro cell base station 100 (when the UE 300 is in an idle state), the UE 300 may measure a radio signal in the frequency band fs of the small cell base station 200 at a timing of transition from a non-communication state (an RRC_IDLE state in LTE) to a communication state (an RRC_CONNECTED state in LTE).

In addition, when the UE 300 has attempted to connect to the macro cell base station 100 in an initial access time (random access channel (RACH) transmission time), the UE 300 may be instructed to attempt to have initial access to the small cell base station 200 at the time of transmission of an initial access response (RACH response) from the macro cell base station 100 to the UE 300.

In addition, in the RRC_IDLE state and the RRC_CONNECTED state, numerical values of various types of parameters for quality measurement may change.

Also, the communication control apparatus 1 may be provided in the base station or provided as an apparatus independent of the base station. In addition, the communication control apparatus 1 may be provided in the UE 300. In this case, an example in which the small cell base station information, for example, is supplied from the base station to which the UE 300 is connected to the UE 300 may be included. When the UE 300 includes the communication control apparatus 1, the UE 300 has a function of determining the quality measurement timing.

In addition, although a wireless communication system of LTE is included as an example of the wireless communication system in the above-described embodiment, the present invention is also similarly applicable to other wireless communication systems.

In addition, although the case in which the search for the small cell base station 200 for which the handover is possible is performed has been described in the above-described embodiment, the present invention is similarly applicable even when the search for the macro cell base station 100 for which the handover is possible is performed. In this case, instead of the small cell base station information, information (macro cell base station information) indicating presence/absence of the macro cell base station 100 in a predetermined range from the small cell base station 200, the number of macro cell base stations 100, and a position of the macro cell base station 100, a direction of the macro cell base station 100, and the size of a macro cell is used. In addition, the control unit of the communication control apparatus instructs the UE 300 present within the predetermined range from the small cell base station 200 to perform quality measurement in the frequency band fin of the macro cell base station 100 when the macro cell base station 100 is present within the predetermined range from the small cell base station 200 based on the macro cell base station information.

INDUSTRIAL APPLICABILITY

According to the present invention, it is possible to improve efficiency in the measurement of a radio signal using a measurement gap.

DESCRIPTION OF REFERENCE SYMBOLS

1 Communication control apparatus
11 Terminal information acquiring unit
12 Storage unit
13 Control unit
100 Macro cell base station (radio base station apparatus)
101 Macro cell
200 Small cell base station (radio base station apparatus)
201 Small cell
300 UE (radio terminal apparatus)

The invention claimed is:

1. A communication control apparatus in a wireless communication system having an area in which coverage areas of a macro cell base station and a small cell base station using different frequency bands overlap, the communication control apparatus comprising:
   a storage unit configured to store small cell base station information indicating whether the small cell base station is present within the coverage area of the macro cell base station; and
   a control unit configured to instruct a radio terminal apparatus present within the coverage area of the macro cell base station to perform switching of a frequency band of the macro cell base station to a frequency band of the small cell base station and quality measurement in the frequency band of the small cell base station when the small cell base station is present within the coverage area of the macro cell base station and the radio terminal apparatus is moving toward the small cell base station based on the small cell base station information and movement information of the radio terminal apparatus.

2. A communication control apparatus in a wireless communication system having an area in which coverage areas of a macro cell base station and a small cell base station using different frequency bands overlap, the communication control apparatus comprising:
   a storage unit configured to store macro cell base station information indicating whether the macro cell base station is present within a predetermined range from the small cell base station; and
   a control unit configured to instruct a radio terminal apparatus present within the predetermined range from the small cell base station to perform switching of a frequency band of the small cell base station to a frequency band of the macro cell base station and quality measurement in the frequency band of the macro cell base station when the macro cell base station is present within the predetermined range from the small cell base station and the radio terminal apparatus is moving toward the macro cell base station based on the macro cell base station information and movement information of the radio terminal apparatus.

3. The radio base station apparatus comprising the communication control apparatus according to claim 1.

4. The radio terminal apparatus comprising the communication control apparatus according to claim 1.

5. A radio terminal apparatus in a wireless communication system having an area in which coverage areas of a macro cell base station and a small cell base station using different frequency bands overlap and having the communication control apparatus according to claim 1, the radio terminal apparatus comprising:
   a receiving unit configured to receive the instruction of the quality measurement from the communication control apparatus; and
   a measuring unit configured to perform the quality measurement based on the instruction of the quality measurement from the communication control apparatus.

6. A communication control method in a wireless communication system having an area in which coverage areas of a macro cell base station and a small cell base station using different frequency bands overlap, the communication control method comprising:
   a storage step of storing small cell base station information indicating whether the small cell base station is present within the coverage area of the macro cell base station; and
   a control step of instructing a radio terminal apparatus present within the coverage area of the macro cell base station to perform switching of a frequency band of the macro cell base station to a frequency band of the small cell base station and quality measurement in the frequency band of the small cell base station when the small cell base station is present within the coverage area of the macro cell base station and the radio terminal apparatus is moving toward the small cell base station based on the small cell base station information and movement information of the radio terminal apparatus.

7. A communication control method in a wireless communication system having an area in which coverage areas of a macro cell base station and a small cell base station using different frequency bands overlap, the communication control method comprising:
   a storage step of storing macro cell base station information indicating whether the macro cell base station is present within a predetermined range from the small cell base station; and
   a control step of instructing a radio terminal apparatus present within the predetermined range from the small cell base station to perform switching of a frequency band of the small cell base station to a frequency band of the macro cell base station and quality measurement in the frequency band of the macro cell base station when the macro cell base station is present within the predetermined range from the small cell base station and the radio terminal apparatus is moving toward the macro cell base station based on the macro cell base station information and movement information of the radio terminal apparatus.

* * * * *